United States Patent Office 3,299,798
Patented Jan. 24, 1967

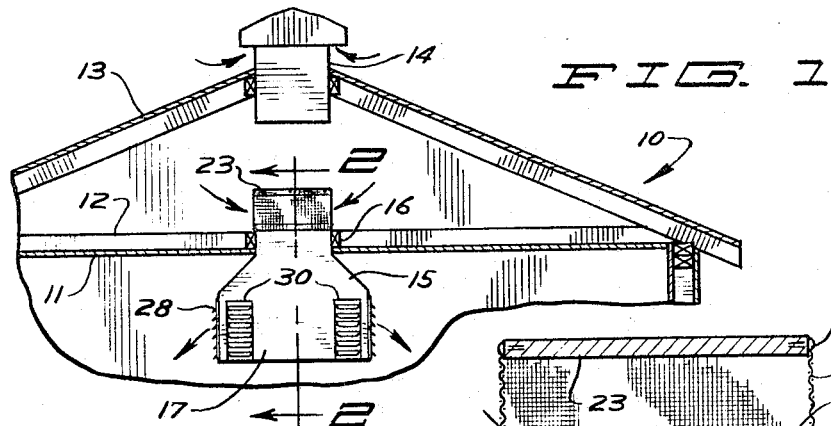
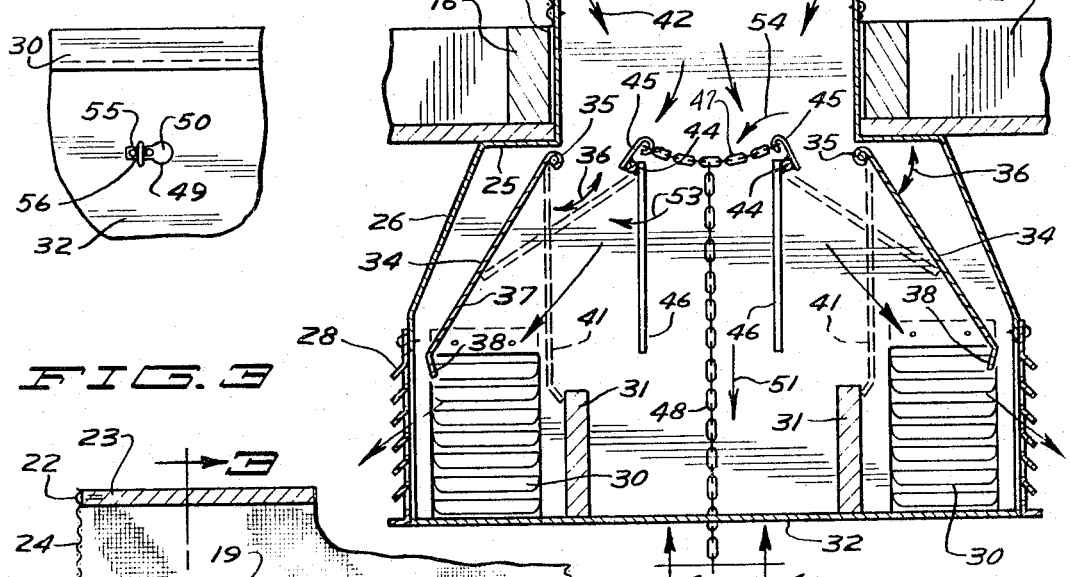
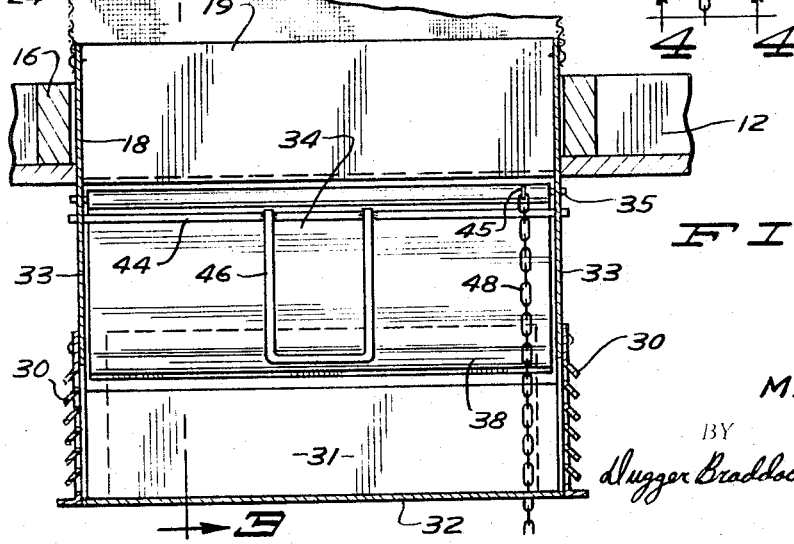

3,299,798
AIR OPERATED FRESH AIR VENTILATOR
Marvin Nabben, 3521 4th Ave. S.,
Minneapolis, Minn. 55406
Filed Mar. 10, 1965, Ser. No. 438,607
2 Claims. (Cl. 98—119)

The present invention has relation to ventilators for buildings and more particularly to an air operated ventilator which operates to permit air flow into a building but closes to prevent air from flowing out of the building.

The present device is a ventilator which is normally needed in large buildings housing livestock or poultry. To provide for a change of air, exhaust fans are usually used in this type of building and air is taken in through ventilators that have, as shown in the present invention, valves operated by differential air pressure and which open to permit the fresh air to come into the building, but will close and prevent heated air to move out of the building. This valve action helps eliminate drafts which are objectionable. When the air pressure inside the building drops a sufficient amount the ventilator valves will open to permit air to enter the building. The valves of the present invention are designed to obtain greater flow for a smaller differential of air pressure and further are designed to increase the flow of air in all of the portions of the ventilator housing.

Further, where no exhaust fans are being used, the warm air rising up toward the ceiling where the ventilator is installed will mix with fresh air coming in through the intake. The mixed air moves throughout the building at a slow rate to give fresh air for all of the stock in the building.

By taking in fresh air adjacent the ceiling, floor drafts are eliminated and the movement of air is usually much slower so that no objectionable draft occurs.

It is therefore an object of the present invention to present an air oparted fresh air ventilator for buildings which gives greater distribution of air through all portions of the air distributor of the intake and which gives greater air flow for the same ventilator size than previous devices.

In the drawings,

FIG. 1 is a fragmentary sectional view of the building showing a ventilator made according to the present invention installed in the ceiling of the building;

FIG. 2 is a fragmentary enlarged sectional view taken as on line 2—2 in FIG. 1;

FIG. 3 is a sectional view taken as on line 3—3 in FIG. 2; and

FIG. 4 is a fragmentary view of a portion of the bottom of the device of FIG. 1 showing a key hole slot for retaining a chain for controlling a device that will hold the ventilator in open position.

Referring to the drawings and the numerals of reference thereon, a frame building 10 which is used for housing poultry or livestock is provided with a ceiling 11 supported on joists 12. The roof 13 is provided with an intake 14 of the usual type which is merely a constantly open opening.

The ceiling 11 supports an intake ventilator made according to the present invention. The intake ventilator 15 is, as shown, supported on suitable bracing 16 and comprises an outer housing 17 which is rectangular in shape adjacent the lower portions and tapers at its upper portions to form a rectangular duct 18 which passes through the ceiling. The duct 18 is open at its top as at 19 and a cover member 22 is placed over the opening 19. The cover 22 comprises a piece of wood or other material 23 which is supported with a screen material 24 on the duct 18. The screen material 24 prevents birds or insects from coming into the ventilator.

Just below the ceiling, the housing is expanded to join the lower portions of housing 17 with an offset portion 25 and tapered outer wall portion 26. The lower portion of the ventilator housing 17 is provided with suitable grills 27 along two sides thereof. On the ends of the housing a separate end grill panel 30 is installed adjacent the corners. On the inside of the housing 17 a pair of divider walls 31, 31 are mounted on a bottom wall 32 and extend upwardly therefrom. The divider walls 31, 31 extend between the end walls 33, 33 of the housing 17. The divider walls 31, 31 are substantially vertically aligned with the outer edges of the duct 18.

A pair of spaced apart valve flaps 34, 34 are hingedly mounted inside the housing 17 on suitable pin type hinges. The hinges are comprised as rods 35, 35 which extend between the end walls 33, 33. The valve flaps 34, 34 are merely looped over the pin 35 and the assembly is free to pivot with respect to the end walls 33, 33. The flaps pivot in directions as indicated by the double arrows 36 in FIG. 3. Considering the walls 31, 31 as extensions of the duct 18 the flaps actually cover openings in the duct in their closed position.

Each of the valve flaps 34, 34 includes a straight main section 37 and a small end section 38 which is bent out of the plane of the main section 37 on each of the valve flaps. The angle that the section 38 is bent out of the plane of the wall is between 45° and 50°. Further, the width of the bent section 38 in relation to the width (or height) of the main section 37 is on a ratio of about 8 or 9 to 1. In other words, if the bent section 38 is one inch wide the main section 37 will be approximately eight or nine inches wide from the bend up to the pin hinge 35.

In their normal positions, without any air flowing through the ventilator, the flaps will hang at positions as shown in dotted lines at 41 with the end section 38 of each of the flaps resting against one of the divider walls 31. This in effect closes the open duct 18. The pins 35 are positioned so that this will occur under the normal forces of gravity. However, when the air pressure in the building is reduced, the pressure differential will cause the flaps to move outwardly and air will come into the building as shown by arrows 42, in through the screen 24 and into the duct 18. The end section 38 of the flaps 37 cause the air flow to change direction as it flows past the flaps and thereby increasing the pressure against these valve flaps and causing the valve flaps to open wider than they normally would without the bent section.

As shown in FIG. 3 the flaps will open quite wide and the air flow flowing against the bent section 38 maintains the valves in this wide-open position without as great a pressure differential on the valves as should normally be required to hold the valves in this wide-open position. Further, the air flow hitting the bent sections 38 is deflected somewhat downwardly toward the bottom panel 32. This change in direction of flow of the air flow which is moving over the main section 37 and then strikes the bent section 38 of each of the ventilator valves caues a much better air distribution, particularly out the corners of the housing 17 and out through the end ventilators or grills 30. This promotes greater mixing of the warm air rising up to the ceiling of the building with the fresh cool air coming in through the ventilator. The amount of air interchanged under a given differential of pressures on the ventilators is increased using the small bent section of the bottom edges of the ventilator valve flaps.

Thus, merely by bending the bottom portions of the valve flaps 37 the same size ventilator housing will give greater air flow as well as better distribution and mixing of the air coming in through the ventilator with the air in the building.

When the air pressure stabilizes the flaps will again close under force of gravity and thereby close the openings to duct 18. This in turn makes for better conditions inside the building and to promote animal or livestock growth and health. Further, fewer ventilators will be necessary for a standard size building, which in turn will reduce the overall operating costs and increase efficiency of the operation.

Another feature of the ventilator made according to the present invention is that the valve flaps 34 can be retained in an open position during the summer or at other times as necessary, to provide for escape of heated air, which normally rises, from the building. The structure for holding these valve flaps open is relatively simple. It comprises a pair of spaced apart substantially parallel rods 44, 44 which are pivotally mounted to the opposite end panels 33, 33 in a suitable manner. The rods 44, 44 are substantially parallel to the rods 35, as shown. Each of the rods 44 has a control lever 45 welded thereto adjacent one of the end panels 33 (see FIG. 2). In addition, in the center portions of each of the rods 44 a U-shaped stop member 46 is welded. There is a separate U-shaped stop member 46 on each of the rods 44. The U-shaped stop members 46 are of length so that they depend downwardly in normal position as shown in FIG. 3.

The control levers 45, 45 have a cross chain 47 attached thereto and pull chain 48 (ordinary close link chain can be used) is attached to the cross chain 47 and extends downwardly through a key hole shaped slot 49 and will extend far enough down so that a person can reach it from the building to control the pivoting of the rod 44.

When the flaps 34 are to be held open the pull chain 48 is moved so it is in the large portion 50 of the keyhole slot 49. The chain is pulled downwardly in direction as indicated by arrow 51. The chain exerts a force on levers 45 which creates a torque causing the rods 44 to pivot in direction as indicated by arrows 53 and 54 so that the U-shaped brackets 46 will strike the flaps 34 and move them away from the members 31. When the flaps are in an open position (the rods 44 have pivoted far enough), the pull chain 48 is moved so that one of the links 55 of the chain is in the narrow portion 56 of the key hole slot 49. The next lower link of the chain will be held by the bottom panel from moving up in direction opposite that from arrow 51. Thus the flaps 34 will be held in open position until the pull chain is released (moved to the large portion 50 of the key hole slot) and permitted to move back so that the members 46 assume their normal position and do not contact the flaps 34.

This gives the ventilator added utility for summer use.

The valve flaps are designed so that they will not permit air flow out of the building. If the pressure inside the building exceeds that outside the building, the valves close off duct 18 and prevent any flow of air out. This prevents drafts as well.

The lower portions of the housing which hold the valve flaps is below the ceiling and actually within the building. This minimizes the problems encountered from "frosting" the valves in cold weather. The temperature inside the building is usually high enough to melt any frost that may occur.

What is claimed is:

1. An air ventilator comprising a duct adapted to receive fresh air and having a portion thereof protruding into a building, said duct having a substantially upright axis, an intake opening open out of said duct, a flap type valve to cover said opening, said flap type valve being suspended from a substantially horizontal axis and movable from a first gravity held position wherein it substantially closes off air flow from said duct to a second position wherein it permits air flow from said duct, said flap type valve having a lower end portion bent out of the plane of the main portion of the valve and toward the direction of incoming air flow, and means to move said valve to and hold it in said second position, said means including a stop member pivotally mounted in spaced relation to said flap valve at the air inlet side thereof for movement from a first location spaced from said flap valve to a second location wherein an outer end of said stop member bears against said flap valve to move it and hold it in said second flap valve position, a control lever integral with said stop member, and manually operable means operative on said control lever to cause said stop member to move between said first and second locations.

2. The combination as specified in claim 1 wherein said manually operable means is constituted as a chain, and holding means for receiving a portion of said chain to retain said stop means in at least one of said first and second locations.

References Cited by the Examiner

UNITED STATES PATENTS

| | | | |
|---|---|---|---|
| 1,222,394 | 4/1917 | Grimes | 98—119 |
| 1,648,322 | 11/1927 | Olson et al. | 98—119 |
| 1,975,316 | 10/1934 | Ferris | 98—119 X |
| 1,985,880 | 1/1935 | Blommers | 98—119 X |
| 2,227,990 | 1/1941 | Zelt | 98—37 |
| 2,911,900 | 11/1959 | Rudy | 98—119 X |
| 2,940,377 | 6/1960 | Darnell et al. | 98—119 X |

ROBERT A. O'LEARY, *Primary Examiner.*

M. A. ANTONAKAS, *Assistant Examiner.*